United States Patent [19]
McGroarty et al.

[11] Patent Number: 5,091,234
[45] Date of Patent: Feb. 25, 1992

[54] COMPOSITE WATER BARRIER SHEET

[76] Inventors: Bryan M. McGroarty; Patrick J. McGroarty, both of 2600 Paramount Dr., Spearfish, S. Dak. 57783

[21] Appl. No.: 374,213

[22] Filed: Jun. 30, 1989

[51] Int. Cl.$^5$ ............................................. D06N 7/04
[52] U.S. Cl. ................................. 428/143; 405/107; 405/116; 428/150; 428/246; 428/252; 428/283; 428/284; 428/331; 428/913
[58] Field of Search ............... 428/283, 325, 246, 913, 428/284, 331, 252, 143, 150, 286; 405/107, 116

[56] References Cited

U.S. PATENT DOCUMENTS

| | | | |
|---|---|---|---|
| 3,445,322 | 5/1969 | Saiia et al. | 161/113 |
| 3,561,177 | 2/1971 | Agro et al. | 52/173 |
| 4,250,172 | 2/1981 | Mutzenberg | 428/300 |
| 4,424,248 | 1/1984 | Tesch et al. | 428/300 |
| 4,495,235 | 1/1985 | Tesch | 428/300 |
| 4,501,788 | 2/1985 | Clem | 428/240 |
| 4,530,869 | 7/1985 | Tesch | 428/300 |
| 4,622,260 | 11/1986 | Tesch | 428/300 |
| 4,693,923 | 9/1987 | McGroarty et al. | 428/148 |
| 4,733,989 | 3/1988 | Harriett | 405/43 |
| 4,815,963 | 3/1989 | Berkout | 428/283 |

Primary Examiner—James J. Bell
Attorney, Agent, or Firm—Kinney & Lange

[57] ABSTRACT

A water barrier sheet that is a composite of a membrane of impervious material, such as high density polyethylene, a layer of particles which are capable of swelling in presence of a liquid, such as sodium montmorillonite, or modified sodium montmorillonite that is organophilic held on the membrane, and an overlying sheet of water permeable material that is caused to adhere to the particulate layer. The water permeable material layer is a cloth sheet that tends to keep the layer of particulate material together and protects the particles from mechanical abrasion, and yet permits liquids to penetrate into the layer of particulates for waterproofing action.

3 Claims, 1 Drawing Sheet

COMPOSITE WATER BARRIER SHEET

BACKGROUND OF THE INVENTION

1. Field of the Invention.

The present invention relates to composite waterproofing sheets which include a multiple layer assembly having a water impervious sheet or membrane forming a base layer, a layer of particulate material overlying the base layer, and a covering of a water permeable material such as a non-woven or woven fabric.

2. Description of the Prior Art.

U.S. Pat. No. 4,693,923 shows a water barrier product that has a water impervious sheet to which a layer of particulate material, such as sodium montmorillonite, which swells in the presence of a liquid, is adhered.

The layer of particulate material has to be formed so that it remains generally in the layer, and can be attached to the backing sheet in any desired manner.

SUMMARY OF THE INVENTION

The present invention relates to a composite waterproofing sheet that can be placed for liquid leak proofing for building structures, such as subterranean walls, other large building components or structures, and for lining ponds or tanks to insure that no leakage occurs.

A liquid permeable or porous sheet covering the particulate layer permits entry of liquids into a particulate layer made of particles which will swell in the presence of a liquid. For example, sodium montmorillonite or bentonite particles will swell or gel in the presence of water. Prior to the swelling, the water permeable sheet helps to hold the particulate material layer together, to prevent mechanically abrading away portions of the layer.

The water impervious or impermeable membranal sheet can be a layer of polymeric membrane, such as high density polyethylene. The particulate layer and polymeric membrane can be caused to adhere together such as by softening a surface of the polyethylene, or spraying on the membrane in a plasticized form to provide an adhesive character so that the particles of bentonite and the polymeric layer will adhere together and stay as a unit.

Preferably, adhesives are used for holding the particulate material together, and to the impervious sheet. This is disclosed in U.S. Pat. No. 4,693,923. When the composite is manufactured, the adhesive that is near the outer surface of the layer of particulate material can be left in a tacky condition, and then the cloth or water permeable (porous) layer can be placed over the particulate layer and adhered to the particles with the adhesive that is left in place. The water permeable layer also can be retained with a separate adhesive layer. Additionally, a permeable or porous layer that is sprayed into place can be added over the outer surface of the particulate layer to form the covering that produces or prevents mechanical abrasion of the particles and subsequent loss thereof.

The composite waterproofing sheet provides a low cost way of making a product that will stand up under abrasion with one surface exposed, (the water permeable layer) and which will reduce problems with erosion or the like at the bottom of a pond, canal, trench or the like.

DETAILED DESCRIPTION OF THE PREFERRED EMBODIMENTS

Figure 1:
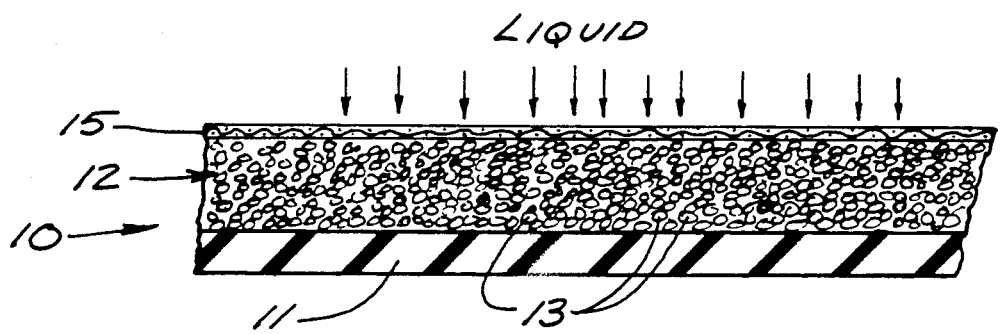
FIG. 1 is a cross-sectional view of a typical waterproofing sheet made according to the present invention.

In FIG. 1, a waterproofing sheet indicated generally at 10 comprises a membrane or sheet 11 of a polymeric material, such as high density polyethylene, or some other water impermeable material. The impermeability of the sheet of material can be selected as desired, and the thickness can be such that the sheet 11 itself is somewhat flexible to semi-rigid. The sheet 11 provides a support of a layer 12 of particulate material. The layer 12 is made up of individual particles 13 of a material, such as a clay, that will swell in the presence of water or other liquid. This can be either a sodium montmorillonite (bentonite) that swells in the presence of water, or a modified clay that has been treated to become organophilic (sensitive to organic compounds).

The membrane of sheet 11, which comprises the base sheet, can be sprayed onto the layer of particles 12, if the layer 12 is separately formed, or in some other way adhered to layer 12. Use of adhesives is one way that particles 13 can be caused to form a layer, as shown in U.S. Pat. No. 4,693,923. The layer 12 is made to be of suitable thickness, for example in the range of $\frac{1}{4}''$ thick or more. The individual particles 13 are adhered together, and adhesives such as those disclosed in U.S. Pat. No. 4,639,923 can be used.

The process of making the composite sheet 10 can be any desired process such as spraying in the adhesive at the same time the particles are laid down, or adding the adhesives and particles in sequential layers as shown in U.S. Pat. No. 4,693,923. A composite of the backing membrane sheet 11 and the layer 12 of particulate material is then covered with a sheet of woven or non-woven fabric or other liquid permeable or porous layer indicated generally at 15. The water permeable sheet will be caused to adhere to the particulate layer 12 on an opposite side of layer 12 from the membrane 11. The particulate layer 12 can be left with an uncured adhesive on its outer surface, and then a fabric sheet laid down into place. The composite can be either compressed with a pair of rollers, or the sheet 15 can be caused to come into contact with material on layer 12 which causes sheet 15 to adhere to layer 12. The fabric sheet, if it is a non-woven or woven material, can be made of polypropylene, or other synthetic fibers as, well as natural fibers.

Of course a separate layer of adhesive can be placed on to an existing particulate layer 12 before laying down the fabric sheet 15.

The fabric sheet is a water permeable sheet or layer of material that has some strength, so that it does not separate easily, and when in place on the particulate layer 12 the sheet 15 will take some abrasion or contact with other materials without causing erosion or dislodging of the particles 13 in the layer 12.

The three layers, including the impervious sheet 11 and the particulate layer 12, which contains particles that swell in the presence of liquid, and the liquid permeable cover sheet 15 can be formed as a unit and then stored in rolls having a desired width and length prior to use. This makes the composite sheets easily stored. Again, the outer fabric or water permeable sheet or layer 15 aids in protecting the particles from dislodgement by mechanical abrasion or such things as wave action if the sheet 10 is used for lining a pond or canal.

Figure 2:
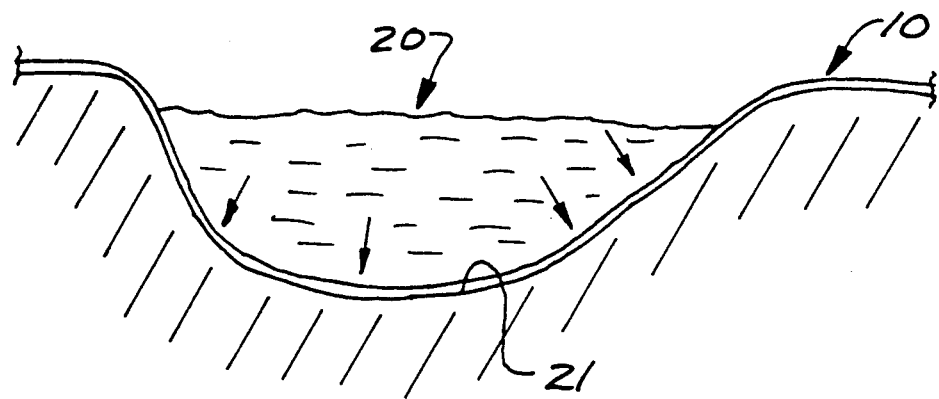
FIG. 2 is a cross-sectional view of a schematic showing of a sheet made according to the present invention installed for lining a canal or pond and preventing leaks from such pond.

In FIG. 2, composite sheet 10 is shown as lining a pond or canal indicated generally at 20. The composite sheet is supported directly on an earthen support indicated at 21. The composite sheet 10 is made as shown in FIG. 1, with the water impervious sheet 11 directly supported on the earth 21, and the liquid gelling or expandable particles 13 in the layer 12 being in the upper side of the impermeable layer The particles would be selected to be the type that would swell in the presence of the liquid shown in FIG. 2, which may be a hazardous waste or water. If it is water, sodium montmorillonite particles can be used in layer 12 because they gel and swell in the presence of water. The water would be able to contact the layer 12 through the water permeable sheet or layer 15, which preferably is a woven or non-woven cloth that has openings therein for permitting the passage of water or other liquids therethrough.

If organic compounds are stored in the pond 20, then the particles 13 would be selected to be treated clay particles that would swell in the presence of organic compounds. Such treatment of clay particles to cause them to be organophillic is well-known, and such particles will swell in the presence of organic compounds to cause a leak proofing action.

Although the present invention has been described with reference to preferred embodiments, workers skilled in the art will recognize that changes may be made in form and detail without departing from the spirit and scope of the invention.

What is claimed is:

1. A composite leakproofing sheet comprising:
   a support membrane of a substantial size;
   a layer of particles of bentonite adhered to the support membrane and with the particles adhered to each other with a suitable adhesive to cause the particles to be retained in a layer on the support membrane, said particles swelling in the presence of liquid to provide a leakproofing action, and a cover layer of a porous fabric sheet secured to the layer of bentonite particles solely by adhesive for retaining the cover sheet in place to protect the bentonite particle layer from abrasion, while permitting liquids to pass through the porous sheet to contact the bentonite particles to provide the waterproofing action.

2. The leakproofing sheet of claim 1, wherein the porous fabric is made of a synthetic fiber.

3. The waterproofing sheet of claim 2, wherein the support membrane is a water impervious thermoplastic material.

* * * * *